United States Patent [19]

Korrenn et al.

[11] 4,072,372

[45] Feb. 7, 1978

[54] HEAVY-DUTY SWIVEL BEARING

[75] Inventors: Heinz Korrenn, Obbach; Wolfgang Teich, Schweinfurt; Helmut Heimrich, Sennfeld, all of Germany

[73] Assignee: Kugelfischer Georg Schafer & Co., Schweinfurt, Germany

[21] Appl. No.: 741,126

[22] Filed: Nov. 11, 1976

[30] Foreign Application Priority Data

Nov. 12, 1975 Germany .............................. 2550791

[51] Int. Cl.² ......................... F16C 23/04; F16C 33/10
[52] U.S. Cl. ..................................... 308/72; 308/239; 308/DIG. 8; 308/DIG. 9
[58] Field of Search ........... 308/72, 196, 187, DIG. 8, 308/78, DIG. 9, 235, 216, 239, 240

[56] References Cited
U.S. PATENT DOCUMENTS 3,535,006  10/1970  Orkin et al. .............................. 308/72

3,938,868  2/1976  Van Wyk ........................ 308/239 X

FOREIGN PATENT DOCUMENTS 594,359  6/1959  Italy ...................... 308/239

Primary Examiner—Trygve M. Blix
Assistant Examiner—Douglas C. Butler
Attorney, Agent, or Firm—Karl F. Ross

[57] ABSTRACT

A swivelable journal bearing for a shaft of a converter or other heavy-duty equipment comprises a spherically convex inner ring on the shaft and an annular array of rigidly interconnected socket elements each forming at least one seat for an inwardly projecting low-friction insert having a spherically concave face in contact with the ring surface. The socket elements may be short tubes welded to one another or embedded in a shell of concrete; they could also be perforated strips welded together and backed by a concrete shell.

15 Claims, 5 Drawing Figures

HEAVY-DUTY SWIVEL BEARING

FIELD OF THE INVENTION

Our present invention relates to a journal bearing of the swivelable type, especially as used for the shafts of converters or other heavy-duty equipment.

BACKGROUND OF THE INVENTION

It is known, e.g. from German utility model No. 6,808,807, to construct a bearing of this type from three coaxial members with concentrically spherically curved surfaces, i.e. an inner ring secured to the shaft, an outer ring rigid with a support and an interposed cage carrying a multiplicity of low-friction contact elements in engagement with a convex surface of the inner ring. The shaping of these members is rather laborious and, since they must be made from high-quality material, correspondingly expensive.

OBJECT OF THE INVENTION

The object of our present invention, therefore, is to provide an improved bearing of the general character set forth which is of simplified construction, easily manufactured and relatively inexpensive.

SUMMARY OF THE INVENTION

The foregoing object is realized, in accordance with our present invention, by the provision of an outer annular body divided into a multiplicity of rigidly interconnected socket elements, this body coaxially surrounding an inner ring with clearance so as to replace the combination of outer ring and cage in the prior-art bearing described above. Each of the socket elements forms at least one seat open toward the ring to hold a low-friction insert which projects into the clearance and has a spherically concave face in contact with the spherically convex peripheral ring surface.

The several socket elements can have a very simple shape, such as that of short lengths of tubing or perforated strips. In the case of tubular elements, they can be interconnected by welding or by being embedded in a hardenable substance, such as concrete, forming a shell around the ring. In the absence of such a shell, the inserts within the tubes may be backstopped by suitable plugs, preferably also of concrete.

BRIEF DESCRIPTION OF THE DRAWING

The above and other features of our invention will now be described in detail with reference to the accompanying drawing in which.

SPECIFIC DESCRIPTION

Figure 1:
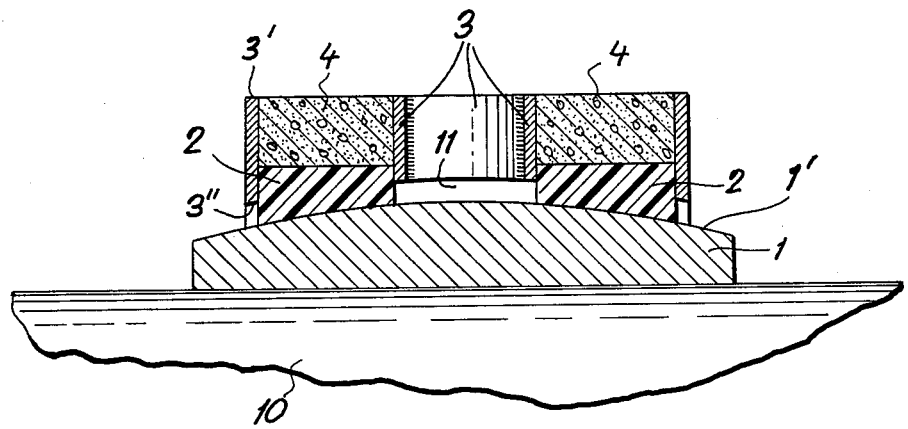
FIG. 1 is a cross-sectional view of a swivelable bearing embodying our invention, including a cluster of tubular socket elements, taken on the line I—I of FIG. 2.
Figure 2:
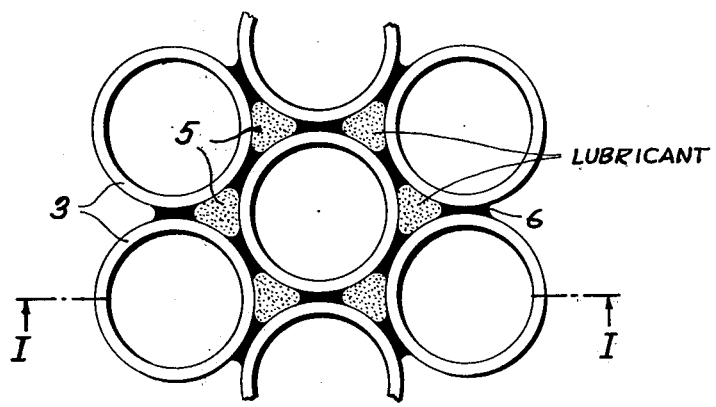
FIG. 2 is a fragmentary developed view of the cluster shown in FIG. 1.

In FIGS. 1 and 2 we have shown a bearing of large surface area including an inner ring 1, embracing a shaft 10, and a cluster of tubular socket elements 3 which are welded together at 6 to form a rigid unitary body coaxial with shaft 10 and ring 1. This body is separated by an annular clearance 11 from the outer peripheral surface 1' of ring 1 which is spherically curved about a center 0 on the shaft axis (see FIG. 5) with a radius $r$. Ring 1 consists of hardened bearing steel and is highly polished along contact surface 1'. This contact surface is engaged by spherically concave end faces, with the same radius of curvature $r$, of a multiplicity of inserts 2 projectingly seated in the tubular socket elements 3. The inserts 2 consist of low-friction metallic or resinous material, e.g. bronze or Teflon, and are backstopped within tubes 3 by plugs 4 of concrete. Advantageously, the outer edges 3' of the metallic tubes 3 lie on an imaginary cylindrical surface centered on the shaft axis whereas the inner tube ends 3" are so ground as to lie on an imaginary spherical surface concentric with ring surface 1'.

To facilitate assembly, the minimum distance $d$ of the inner tube edges from the shaft axis should be at least equal to radius $r$. Upon removal from the shaft 10, a relative swiveling of the ring 1 and the cluster of tubes 3 will make every tube accessible from within for purposes of inspection or possible replacement of an insert 2 removably seated therein.

The spaces 5 formed between welding seams 6 may be filled with a hardenable material, such as that of the plugs 4 (preferably concrete), but could also be occupied by a lubricant, e.g. molybdenum disulfide. Such a lubricant will protect the bearing surface 1' against corrosion and will also tend to pick up any external particles that might have penetrated into the clearance 11.

Figure 3:
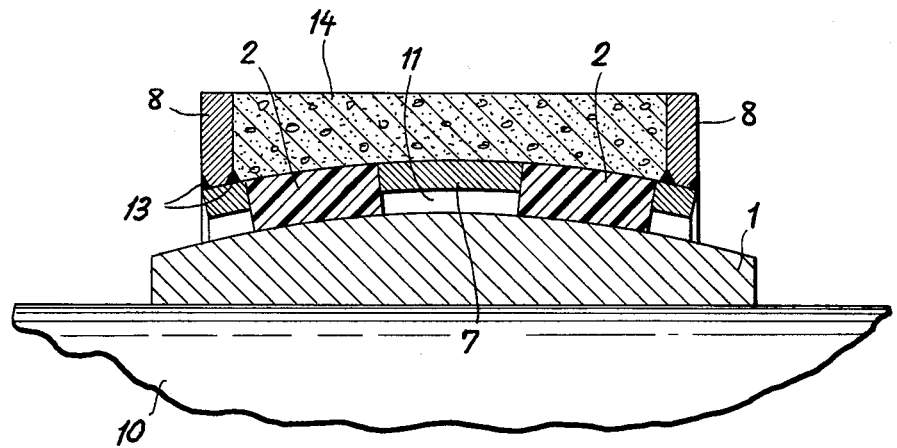
FIG. 3 is a view similar to FIG. 1, illustrating another embodiment including an assembly of perforated strips.
Figure 4:
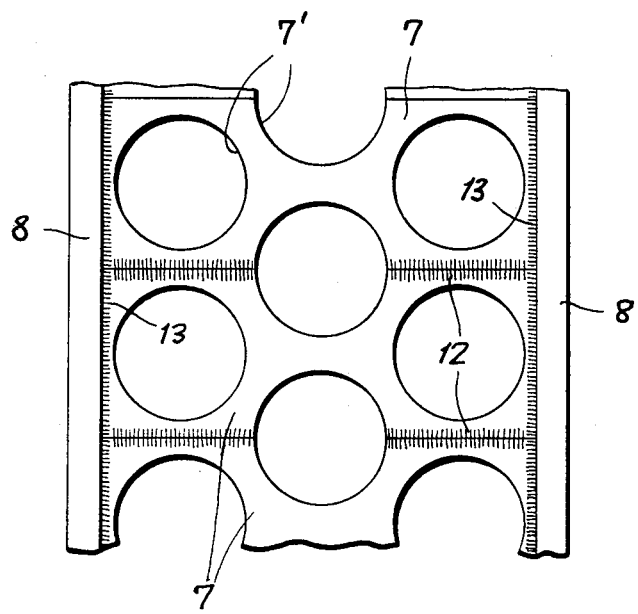
FIG. 4 is a fragmentary developed view of the strip assembly shown in FIG. 3.

In the modification shown in FIGS. 3 and 4 the socket elements are constituted by sheet-metal strips 7 extending generally parallel to the shaft axis, the strips having perforations 7' designed to receive the inserts 2. The strips are welded to one another along seams 12 into an annular array coaxially surrounding the inner ring 1, again with formation of a clearance 11. The ends of the strips are welded at 13 onto the inner peripheries of a pair of hoops 8 centered on the shaft axis, these hoops defining between them an annular trough into which a concrete shell 14 is cast as a backing for the inserts 2. The strips 7 could be flat but, as shown, are advantageously given a spherical curvature concentric with ring surface 1' which is easily accomplished by stamping in a press. The stationary assembly 2, 8, 14 is of light weight and inexpensive to manufacture.

Figure 5:
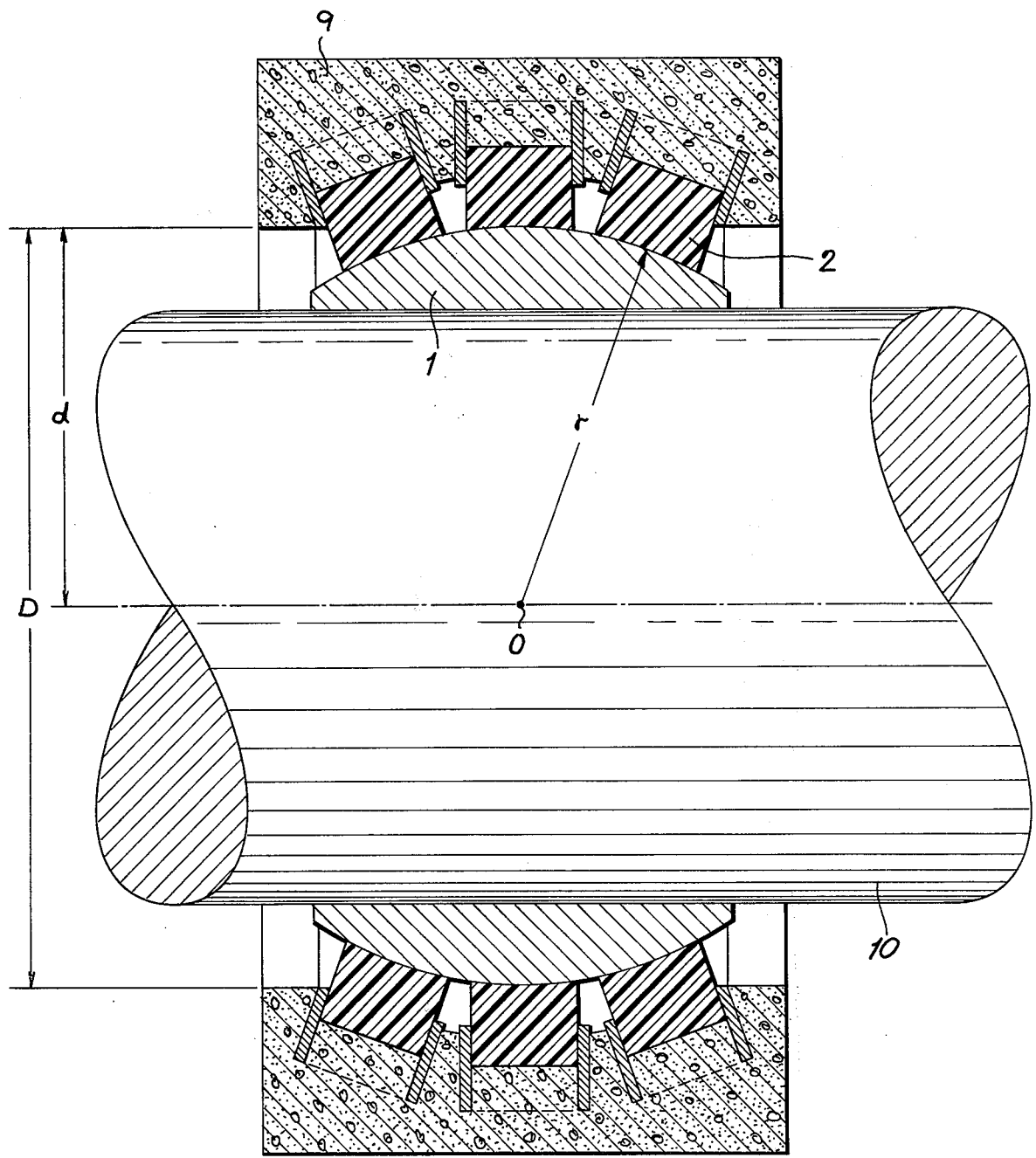
FIG. 5 is another cross-sectional view similar to FIG. 1, showing a further embodiment.

Whereas in FIG. 1 the axes of tubes 3 are located in several parallel planes perpendicular to the axis of shaft 10 and ring 1, the tubes could also be so slanted that their axes intersect at the center 0 as illustrated in the modification of FIG. 5. This Figure further shows an alternate way of assembling the tubes into a rigid body, namely by encasing them in a concrete shell 9 which could form part of a machine housing, converter base or other fixed structure. Again, care should be taken to make the inner shell diameter D large enough (at least equal to $2r$) to permit insertion and extraction of ring 1 into and from the shell.

It will be apparent that in all disclosed embodiments, during assembly, at least some of the inserts 2 may be fitted into their seats only after the inner ring 1 had been introduced into the surrounding structure and has been tilted to make the vacant seats accessible.

We claim:

1. A swivelable journal bearing for a shaft, comprising:

a shaft-supported inner ring with a spherically convex outer surface;

an outer annular body divided into a multiplicity of socket elements rigidly welded to one another, said body coaxially surrounding said ring with clearance, each of said socket elements being provided with at least one throughgoing aperture facing said ring;

a low-friction insert in each aperture projecting into said clearance, said insert having a spherically concave face in contact with and conforming to said outer surface; and a mass of concrete obstructing the end of each aperture remote from said ring in contact with the insert thereof for back-stopping same.

2. A journal bearing as defined in claim 1 wherein said socket elements are tubes extending generally radially toward the ring axis.

3. A journal bearing as defined in claim 2 wherein said tubes form a cluster with intervening spaces, further comprising a lubricant occupying said spaces.

4. A journal bearing as defined in claim 2 wherein said tubes are embedded in a concrete shell surrounding said ring, said mass being part of said shell.

5. A journal bearing as defined in claim 2 wherein said tubes have axes lying in a plurality of planes perpendicular to the ring axis, said tubes having outer ends terminating at an imaginary cylinder surface centered on the ring axis.

6. A journal bearing as defined in claim 1 wherein said socket elements are perforated strips extending generally parallel to the ring axis, said mass being part of a concrete shell surrounding said ring.

7. A journal bearing as defined in claim 6 wherein said shell is flanked by a pair of hoops welded to opposite ends of said strips.

8. A journal bearing as defined in claim 6 wherein said strips are curved generally parallel to said outer surface.

9. A swivelable journal bearing for a shaft, comprising:

a shaft-supported inner ring with a spherically convex outer surface;

an outer annular body divided into a multiplicity of socket elements rigidly welded to one another, said body coaxially surrounding said ring with clearance, each of said socket elements being formed with at least one throughgoing aperture facing said ring;

a low-friction insert in each aperture projecting into said clearance, said insert having a spherically concave face in contact with and conforming to said outer surface; and a plug of a hardenable substance in each aperture back-stopping the insert thereof.

10. A journal bearing as defined in claim 9 wherein said plug consists of concrete.

11. A swivelable journal bearing for a shaft, comprising:

a shaft-supported inner ring with a spherically convex outer surface;

a multiplicity of rigid tubes extending generally toward the ring axis and forming a body coaxially surrounding said ring with clearance; and a low-friction insert in each of said tubes projecting into said clearance, said insert having a spherically concave face in contact with and conforming to said outer surface.

12. A journal bearing as defined in claim 11 wherein said tubes are welded together in a cluster with intervening spaces.

13. A journal bearing as defined in claim 12, further comprising a lubricant occupying said spaces.

14. A journal bearing as defined in claim 11 wherein said tubes are embedded in a concrete shell surrounding said ring.

15. A journal bearing as defined in claim 11 wherein said tubes have axes lying in a plurality of planes perpendicular to the ring axis, said tubes having outer ends terminating at an imaginary cylinder surface centered on the ring axis.

* * * * *